United States Patent [19]
Roessler et al.

[11] Patent Number: 5,197,569
[45] Date of Patent: Mar. 30, 1993

[54] CONSTANT DEPTH RESERVOIR

[75] Inventors: David A. Roessler, Hartland; Donald R. Jung, Oconomowoc; Robert D. Jung, Brookfield; Charles F. Pace, Waukesha; Michael J. Doperalski, Sussex, all of Wis.

[73] Assignee: Trico Mfg. Corp., Pewaukee, Wis.

[21] Appl. No.: 888,955

[22] Filed: May 26, 1992

[51] Int. Cl.$^5$ ............................................. F16N 7/30
[52] U.S. Cl. .................................... 184/55.1; 184/6.26; 184/79; 184/96; 184/103.2; 137/389; 137/390
[58] Field of Search .................. 184/55.1, 7.4, 55.2, 184/103.1, 103.2, 6.26, 74, 75, 76, 79, 80, 82, 96, 105.1; 137/390, 389, 391, 571, 805; 141/198, 95

[56] References Cited
U.S. PATENT DOCUMENTS

| | | | |
|---|---|---|---|
| 539,117 | 5/1895 | Busch | 137/411 |
| 779,357 | 1/1905 | Gardner | 184/55.1 |
| 992,503 | 5/1911 | Howard | 184/55.1 |
| 1,113,276 | 10/1914 | Woodmansee | 184/55.1 |
| 1,571,495 | 2/1926 | Smith | 184/76 |
| 1,600,262 | 9/1926 | Wickham | 184/55.1 |
| 1,610,283 | 12/1926 | Hill | 137/390 |
| 1,688,279 | 10/1928 | Locke | 137/411 |
| 2,227,646 | 1/1941 | Hillman | 137/238 |
| 2,340,455 | 2/1944 | Davis | 184/96 |
| 2,376,623 | 5/1945 | Romberg | 137/130 |
| 2,589,081 | 3/1952 | Hertz | 123/196 M |
| 2,608,993 | 9/1952 | Andrews | 137/577 |
| 2,930,432 | 3/1960 | Engstrom | 137/391 |
| 2,995,213 | 8/1961 | Gross | 184/79 |
| 3,338,262 | 8/1967 | Chopelin | 137/400 |
| 3,447,562 | 6/1969 | Hoffman | 184/55.1 |
| 4,345,668 | 8/1982 | Gaunt | 184/7.4 |

*Primary Examiner*—Ira S. Lazarus
*Assistant Examiner*—Alan B. Cariaso
*Attorney, Agent, or Firm*—Wheeler Law Firm

[57] ABSTRACT

The present invention is an apparatus for regulating the amount of oil, lubricant, or other type of lubricant applied to a surface of a work piece in order to reduce friction during a machining process. It comprises a primary reservoir, a needle valve, float assembly, a liquid drop control orifice, a sight for allowing visual confirmation of the flow rate, an atmospheric vent, an inlet for pressurized air, and a nozzle. The needle valve is slidably engaged into an orifice in the primary reservoir and is actuated by the float assembly. The float assembly floats in the low volume constant depth reservoir and controls the degree to which the needle valve need be open in order to maintain a constant volume of lubricant in the low volume constant depth reservoir. As the volume increases to the required level, the needle valve will close. As the volume decreases, the needle valve will open in order to maintain a constant level of lubricant in the reservoir. Located below the low volume constant depth reservoir is a liquid drop control orifice. This orifice may be adjusted to control the flow of liquid out of the low volume constant depth reservoir. Below the liquid drop control orifice is the sight. The sight is vented to the atmosphere. Additionally, an assembly including a spring, piston, cylinder, and valve can be added to the present invention such that it will only function only when properly pressurized by shop air.

5 Claims, 3 Drawing Sheets

CONSTANT DEPTH RESERVOIR

BACKGROUND OF THE INVENTION

While many coolant or lubricant applicators exist in the marketplace, none combine the features of a lubricant applicator having a constant depth reservoir. The combination of components that form the present invention produce a device that has many valuable features not found in the prior art. Known lubricant and lubricant applicators lack the combination of a structure for regulating the lubricant flow rate, a structure for visually ensuring the flow rate, and an apparatus which turns the lubricant applicator off. Additionally, the present invention does not require a pressurized system in order to measure the lubricant.

SUMMARY OF THE INVENTION

For the purpose of simplification the term lubricant shall be interpreted to include only fluids and to include, in addition to its usual meaning, coolants or other fluids. The present invention comprises a primary reservoir, a needle valve, float assembly, a low volume constant depth reservoir, a liquid drop control orifice, a sight for allowing visual confirmation of the flow rate, an atmospheric vent, a nozzle, a compressed air inlet, and an air piston spring assembly. Lubricant is contained in the primary reservoir which is vented to the atmosphere. The lubricant then flows into the low volume constant depth reservoir by the force of gravity through an orifice in the bottom of the primary reservoir. As the low volume constant depth reservoir fills, the float assembly located within the low volume constant depth reservoir, rises. As the float rises it actuates the needle valve above it. Accordingly the float assembly rises as the level of lubricant rises and the needle valve engages the orifice located in the bottom of the primary reservoir. As the lubricant level decreases in the low volume constant depth reservoir the float assembly is lowered and the needle valve is disengaged from the orifice in the primary reservoir thereby allowing additional lubricant to fill the low volume constant depth reservoir and maintain a predetermined level of lubricant within the low volume constant depth reservoir.

The base of the low volume constant depth reservoir contains two valves. The first valve is a normally closed spring loaded air piston valve which is actuated into the open position when adequate air pressure is supplied through its air inlet. When the air pressure is turned off the spring closes the valve preventing the flow of lubricant out of the low volume constant depth reservoir. The second valve in the low volume constant depth reservoir is the liquid drop control orifice valve. This valve is an assembly comprising an orifice and needle valve that can be precisely adjusted to allow the required amount of lubricant to flow from the low volume constant depth reservoir into the sight structure.

The sight structure is vented to the atmosphere so that atmospheric pressure is always present within the sight structure. This presents the creation of a negative pressure in this structure. The precisely regulated amount of lubricant located in the sight structure moves by gravity through a dispensing tube and into one of two inlets in the nozzle of the present invention. The other nozzle inlet supplies pressurized air. As the pressurized air passes into and through the nozzle, it creates a low pressure cell due to the nozzle's venturi-like design. The low pressure cell draws the lubricant into the nozzle. The lubricant is combined with the pressurized air and is ultimately dispersed into the atmosphere and onto the work piece.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
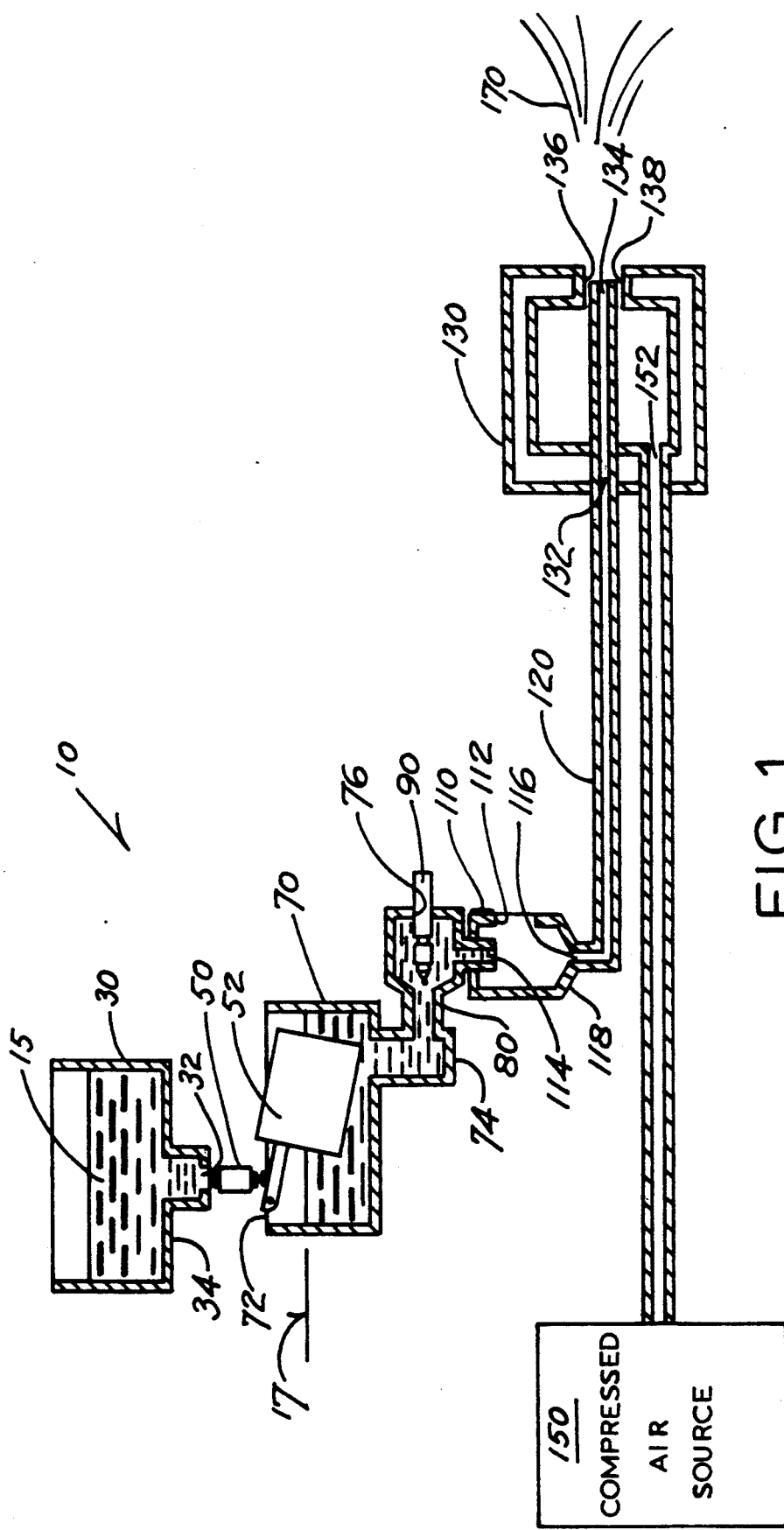
FIG. 1 is a schematic view of the present invention.
Figure 2:
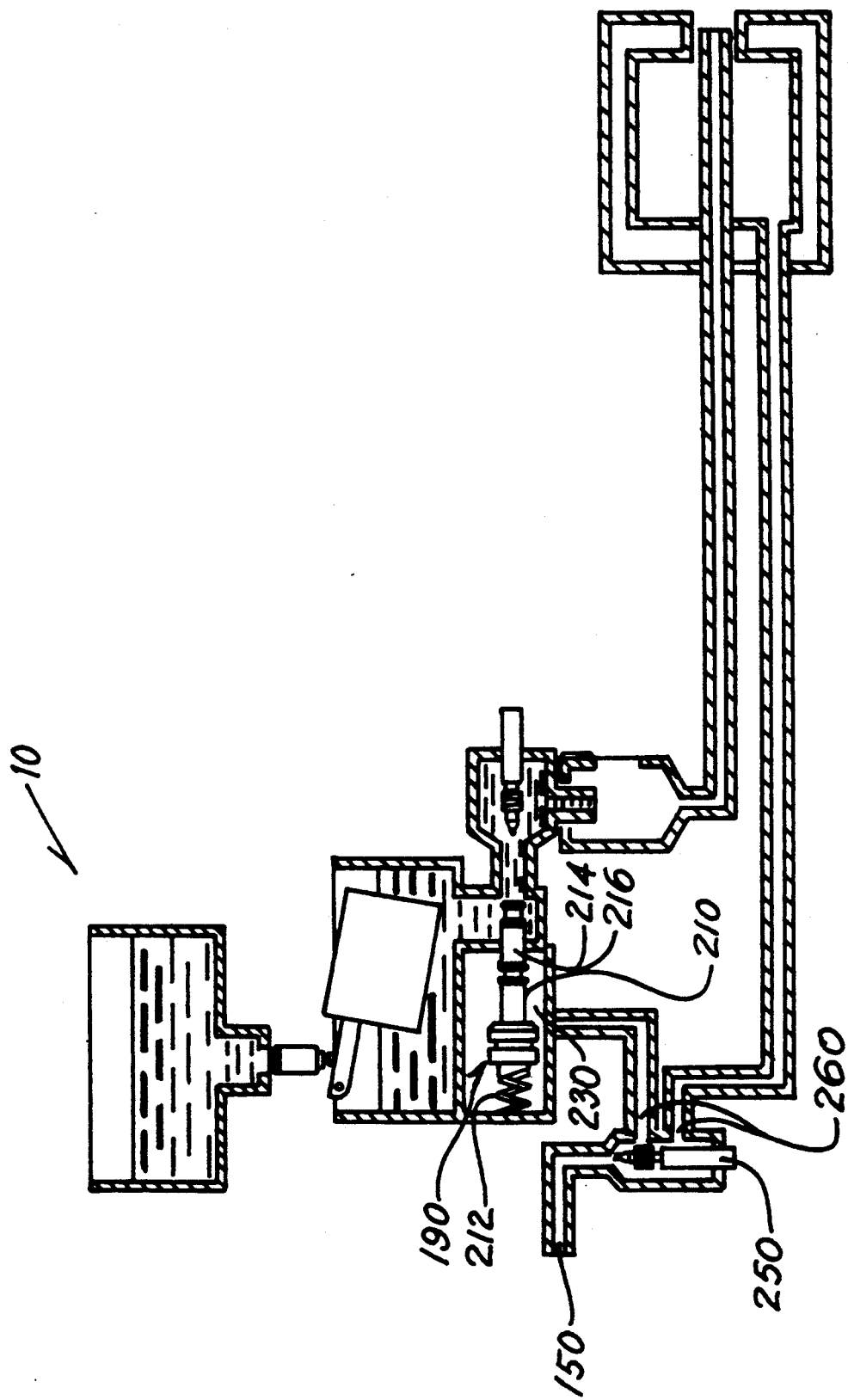
FIG. 2 is a schematic view showing an alternative embodiment of the present invention including the normally closed piston and spring valve assembly.
Figure 3:
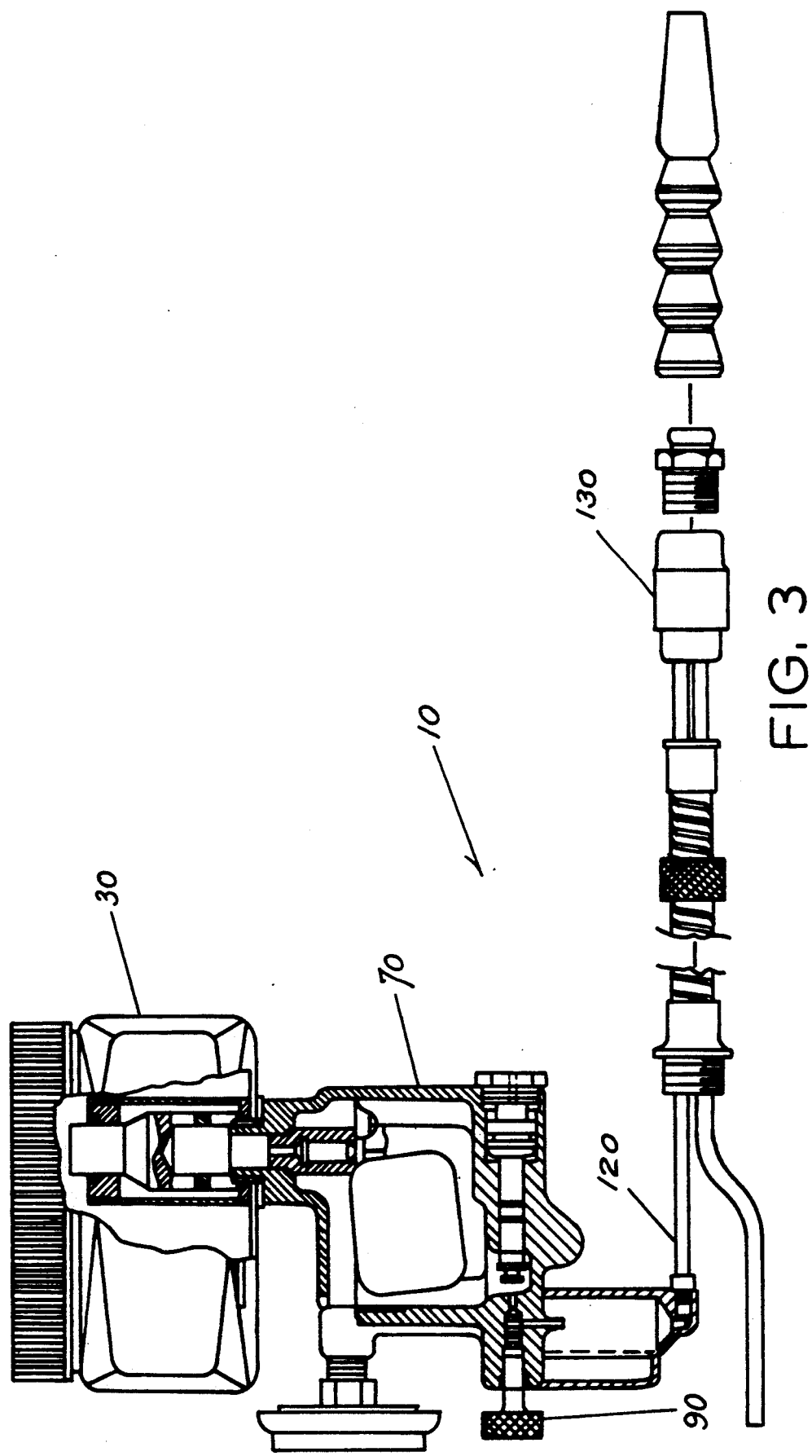
FIG. 3 is a cut away side view of the present invention.

The present invention is an apparatus 10 for regulating the amount of lubricant or fluid which is applied to the surface of a work piece in order to reduce friction and/or heat during a machining process and is shown as in FIGS. 1 and 2.

The apparatus 10 contains a primary reservoir 30 that holds the lubricant 15. The reservoir 30 has a bottom 34 containing a primary reservoir orifice 32. The opening 72 of low volume constant depth reservoir 70 is located beneath primary reservoir orifice 32, such that lubricant 15, flowing through primary reservoir orifice 32 will flow into low volume constant depth reservoir 70.

While the volume of lubricant 15 in primary reservoir 30 is immaterial, low volume constant depth reservoir 70 contains a constant predetermined amount of lubricant 15. As the level of lubricant 15 decreases float assembly 52, located within low volume constant depth reservoir 70, descends. Needle valve 50 is movably supported above float assembly 52. When float assembly 52 is in its uppermost position, needle valve 50 is sealably engaged into primary reservoir orifice seat 32. The flow of lubricant 15 from primary reservoir 30 to low volume constant depth reservoir 70 is stopped when the needle valve 50 is in this position. As float assembly 52 descends needle valve 50 is no longer sealably engaged into primary reservoir orifice seat 32. In this state lubricant 15 from primary reservoir 30 flows through the primary reservoir orifice 32 into the low volume constant depth reservoir 70. As the level of lubricant 15 in low volume constant depth reservoir 70 rises to predetermined level 17, float assembly 52 ascends and needle valve 50 is again sealably engaged into primary reservoir orifice 32. Until float assembly 52 descends, lubricant 15 will not flow. Thus the level 17 of lubricant 15 in low volume constant depth reservoir 70 is nearly constant.

Low volume constant depth reservoir 70 has a bottom portion 74 in which a liquid drop control orifice 80, a threaded portion 76, and a liquid drop control needle valve 90 are mounted. The lubricant 15 flows through liquid drop control orifice 80. The threads of liquid drop control needle valve 90 are engaged with the threaded portion 76 of low volume constant depth reservoir 70. The liquid drop control needle valve 90 is manually rotated to the proper position to allow lubricant 15 to flow through liquid drop control orifice 80 at the desired rate. The lubricant 15 then flows through sight inlet orifice 114 and into sight structure 110. The size and length of orifice 114 are chosen to assist in controlling the rate of fluid deposition into sight structure 110 in a well known relation between size and flow rate.

As the lubricant 15 enters sight structure 110 it is vented at atmosphere by atmospheric vent 112. The lubricant 15 flows through sight outlet orifice 116 located in the bottom 118 of sight 110, into dispensing tube 120, and into inlet 132 of nozzle 130.

Simultaneously pressurized shop air from source 150 flows into nozzle 130 at inlet 152. The pressurized shop air flows through a venturi 136 in nozzle 130 creating a low pressure area at orifice 134 which draws the lubricant 15 from inlet tube 132, mixes the lubricant 15 with the pressurized shop air, and dispenses the mixture through orifice 138 to the desired location. The shop air and lubricant 15 mixture is shown as 170.

FIG. 2 shows an alternative embodiment of the present invention 10. Added between the bottom portion 74 of low volume constant depth reservoir 70 and liquid drop control orifice 80 is a spring and piston valve assembly 190. The assembly consists of a spring 212, a piston 210, a cylinder 230, and a valve 214. Pressurized shop air from source 150 flows past on/off valve 250, through "Y" divider 260, and into the cylinder 230. The pressurized air exerts force against a piston 210 in the cylinder 230 overcoming the opposite force exerted by the spring 212. Piston 210 is directly connected to valve 214 so that as the piston 210 is actuated by the air pressure as described, valve 214 is moved to its open position 216. When the valve 214 is in its open position 216, lubricant 15 flows freely from low volume constant depth reservoir 70 through liquid drop control orifice 80 and is then regulated by liquid drop control needle valve 90.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for dispersing a lubricant comprising:
   a primary reservoir having a first orifice;
   a needle valve;
   a float assembly;
   a low volume constant depth reservoir having a second orifice;
   a liquid drop control needle valve;
   a sight feed having an inlet and an outlet;
   an atmospheric vent;
   a venturi nozzle having first and second inlets and an outlet;
   a pressurized air source;
   said needle valve being engageable with said first orifice in said primary reservoir;
   said float assembly and needle valve capable of variably opening and closing said first orifice of said primary reservoir;
   said low volume constant depth reservoir being located beneath said first orifice in said primary reservoir;
   said liquid drop control needle valve being movable with respect to said second orifice;
   said inlet of said sight being connected to said second orifice of said liquid drop control needle valve;
   said sight feed containing said atmospheric vent;
   said first inlet of said venturi nozzle being removably attached to said outlet of said sight feed;
   said second inlet of said venturi nozzle being connected to the pressurized air source;
   said outlet of said venturi nozzle for dispersing the lubricant into the atmosphere.

2. The invention of claim 1 including:
   an assembly including a spring, piston, cylinder, and valve;
   said assembly being attached to said second orifice of said low volume constant depth reservoir;
   said valve being directly attached to said piston and having an open position and a closed position;
   said spring engaged with said piston to maintain said valve in the closed position;
   said valve being actuated into its open position by a flow of pressurized air, from the pressurized air source, against said piston in said cylinder sufficient to overcome said spring force.

3. An apparatus for regulating an amount of a friction reducing lubricant applied to a surface of a workpiece, the apparatus comprising:
   a primary reservoir, for containing the friction reducing lubricant, having an opening;
   a constant depth reservoir connected to said primary reservoir through said opening for receiving the lubricant;
   said constant depth reservoir including a liquid drop control valve, an orifice and a valve and float assembly;
   said liquid drop control valve capable of opening and closing said orifice;
   said valve and float assembly capable of opening and closing said opening;
   a sight feed having an inlet connected to said constant depth reservoir through said orifice, an outlet connected to a venturi nozzle chamber having a nozzle, and an atmospheric vent;
   a means for supplying compressed air to said nozzle through said nozzle chamber for dispersing the lubricant from said outlet.

4. An apparatus for dispersing a lubricant consisting essentially of:
   a primary reservoir having a first orifice;
   a needle valve engageable with said first orifice;
   a low volume constant depth reservoir having a second orifice;
   a float assembly in said low volume constant depth reservoir;
   said float assembly and needle valve capable of variably closing and opening said first orifice;
   said low volume constant depth reservoir being located beneath said first orifice;
   a liquid drop control needle valve being movable with respect to said second orifice;
   a sight feed vented to atmosphere, having an inlet and an outlet;
   said inlet being connected to said second orifice of said liquid drop control needle valve;
   a venturi nozzle having first and second inlets and an outlet;
   said first inlet of said venturi nozzle being removably attached to said outlet of said sight;

a pressurized air source;

said second inlet of said venturi nozzle being connected to said pressurized air source;

whereby when said float assembly moves up and down in said low volume constant depth reservoir, said float assembly opens and closes said needle valve to a varying degree, and lubricant is transferred from said primary reservoir to said low volume constant depth reservoir by means of gravity feed.

5. An apparatus for dispensing a lubricant, the apparatus comprising:

a primary reservoir containing a lubricant and having a first orifice connected to a constant depth reservoir containing a float assembly that is mechanically connected to a needle valve that is engageable with the first orifice so that the float assembly and the needle valve act in conjunction to variably open and close the first orifice;

whereby the amount of lubricant that passes through the first orifice varies in relation to the degree to which the float assembly and the needle valve open and close the first orifice;

the constant depth reservoir further including a lubricant drop control valve connected to a sight feed vented to atmosphere, said sight feed receives said lubricant regulated by said lubricant drop control valve; said sight feed having an outlet connected to a venturi nozzle;

the venturi nozzle including a first inlet connected to a pressurized air supply and a first outlet to disperse said lubricant.

* * * * *